Oct. 27, 1970   J. L. BEATTY   3,536,372
TUBULAR KALEIDOSCOPE
Filed Jan. 21, 1969
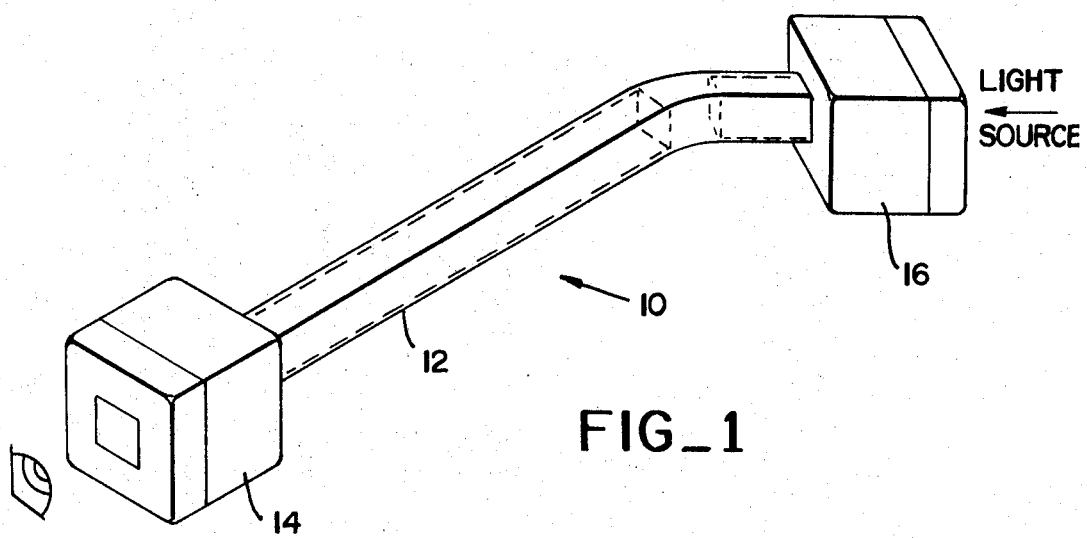
FIG_1
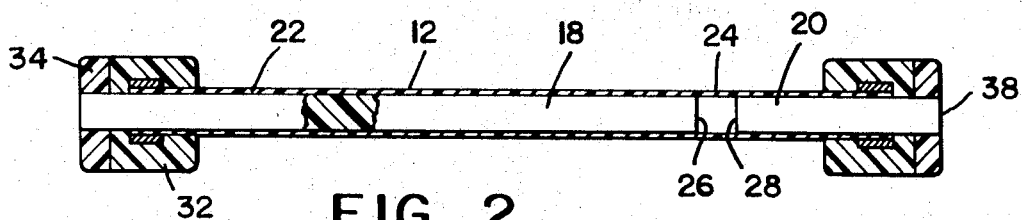
FIG_2
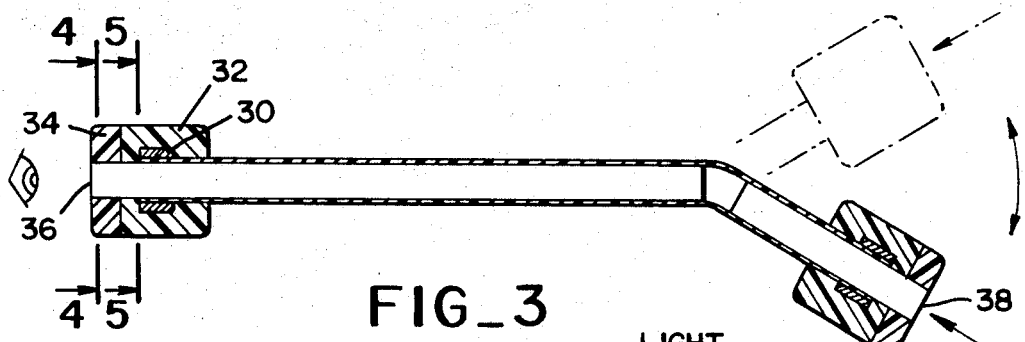
FIG_3
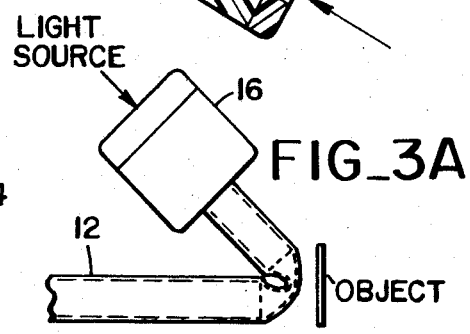
FIG_3A
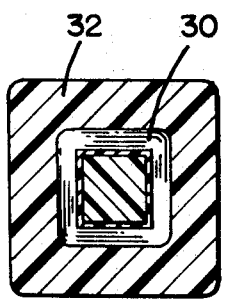
FIG_5
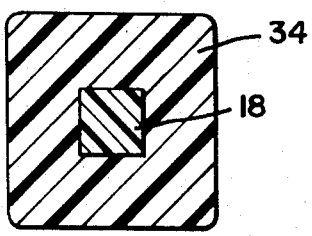
FIG_4
INVENTOR.
JAMES L. BEATTY
BY
Owen, Wickersham & Erickson
ATTORNEYS

United States Patent Office 3,536,372
Patented Oct. 27, 1970

3,536,372
TUBULAR KALEIDOSCOPE
James L. Beatty, 1011 Fountain Walk,
Berkeley, Calif. 94707
Filed Jan. 21, 1969, Ser. No. 792,301
Int. Cl. G02b 5/14, 27/08
U.S. Cl. 350—4                                                             10 Claims

ABSTRACT OF THE DISCLOSURE

A tubular kaleidoscope comprised of a pair of transparent rods, an inner end of one rod being spaced from an inner end of the other rod, both rods being contained within a transparent flexible sheath. The outer ends of both rods are each connected to an eyepiece of light-dispersion material.

---

This invention relates to improvements in devices for producing kaleidoscopic patterns.

A general object of the present invention is to provide a device for producing a nearly infinite variety of eye-pleasing patterns to a viewer. It can be used by persons of all ages as both a source of entertainment as well as a means to expand one's knowledge and appreciation of patterns and designs applicable to various art forms.

In the conventional form of kaleidoscope as heretofore devised, for example as described in U.S. Pat. No. 1,398,858, a series of mirrors are utilized within a paper tube having an eyepiece at one end and an object chamber, usually containing pieces of colored glass or the like, at the other end. This arrangement produces a well known but limited kaleidoscopic effect. In addition, the use of mirrors results in a device that is difficult to assemble and relatively fragile.

My invention overcomes the aforesaid problems and provides a kaleidoscope that produces unique light patterns or optical displays that can be both entertaining and educational. Instead of mirrors, the present invention utilizes transparent rods having flat longitudinal surfaces. The rods are encased in a flexible, transparent sheath that holds them substantially in alignment but spaced apart and thus movable with respect to each other. The outer end of each rod is supported within a rigid member forming an eyepiece or a light receiver depending on which end of the device is placed to the viewer's eye. When the end of one rod within the light receiver is directed toward an object to be viewed which may have color or may simply be a source of white light, a kaleidoscopic pattern will be seen by the viewer at the eye-piece on the other end of the device. Twisting or bending the light receiver end relative to the eyepiece end by flexing the sheath between the rods serves to change the pattern being viewed. When the light receiver is made from a transparent material the light from the light source is dispersed at the light receiver and the pattern seen at the eyepiece includes the colors of the spectrum.

Accordingly, another object of my invention is to provide a kaleidoscope device that is highly versatile in producing an infinite variation of patterns including patterns with spectral variations which are obtainable when viewing white light.

Yet another object of the present invention is to provide a kaleidoscope device that is rugged, durable and yet particularly well adapted for ease and economy of manufacture.

Other objects, advantages and features of my invention will become apparent from the following detailed description of one embodiment thereof, presented in conjunction with the accompanying drawings, in which:

FIG. 1 is a view in perspective of a kaleidoscope device embodying the principles of the present invention;

FIG. 2 is a view in elevation and in section of the device of FIG. 1;

FIG. 3 is a view in elevation similar to FIG. 2 showing one end portion of the device deflected for the purpose of varying the pattern being viewed;

FIG. 3a is a fragmentary view similar to FIG. 3 showing one end portion bent back to provide a different viewing position;

FIG. 4 is an enlarged view in section taken along line 4—4 of FIG. 3; and

FIG. 5 is an enlarged view in section taken along line 5—5 of FIG. 3.

Referring to the drawing, FIG. 1 shows one embodiment of a kaleidoscope device 10, according to my invention as it appears when held up to the eye of the viewer in normal use. Generally, it is comprised of an elongated main body 12 having attached to its opposite ends an eyepiece 14 and a light receiver 16. The latter two components may be identical structurally, but their function will vary depending on which end of the device is placed to the observer's eye, as will be seen later.

The body 12, as shown best in FIG. 2, is comprised of a pair of rods 18 and 20 which are longitudinally aligned and spaced apart a significant predetermined amount. One rod 20 is relatively short (e.g. two to three inches) while the other rod may be from three to five or more times as long as the smaller rod depending on the operating characteristics desired. However, the minimum length of the larger rod 18 should be around eight inches in order to prevent eye strain. Both of the rods have flat sides that are ground to a mirror-polished finish. Preferably, both rods have to same cross-sectional shape and their flat sides are optically aligned, although this is not essential. A simple square cross-section for each rod will produce the unusual kaleidoscopic patterns of my device, although other cross-sectional shapes could be used within the scope of the invention. Both rods are preferably made of a solid transparent material such as glass or some clear plastic such as Lucite. Around both of the rods is a tubular sheath 22 made from a transparent, flexible plastic material such as a clear vinyl that fits tightly on and extends to a point near the outer end of each rod. This sheath forms a flexible tubular joint 24 between the flat spaced apart inner end faces 26 and 28 of the two rods 18 and 20, respectively. The joint 24 thus serves as a means for controlling the kaleidoscopic effect produced by my device. The length of the tubular joint or window 24 can vary depending on the size of the rods and the type of kaleidoscope effect desired. I have found that for rods having a square cross section with a side length around one half inch, a tubular joint having a length of around one inch produces excellent results.

As described earlier, the eyepiece 14 or the light receiver 16 are fixed to the extreme or outer end of the rods 18 and 20. The sheath 22 extends just short of the end of each rod and around each end of the sheath is an enlarged portion 30 for holding the sheath in place within the members 14 and 16. (See FIG. 3.) This enlarged portion may be formed by several wraps of narrow tape, metal material or by any other suitable means that forms a build-up around the sheath and rod. The ends of the rods within the sheath are surrounded by a block 32 of opaque material such as a colored polyester resin or some other suitable material. When this opaque block 32 is molded around the ends of the main body, completely covering the enlarged portion 30 such as wrapped tape, the ends of the body are thus keyed into and held firmly by the end block members. Adjacent to each block of opaque material and surrounding the uncovered end portion of each rod is a somewhat thinner block 34 of clear material such as clear polyester resin. Thus, it is seen that each eyepiece 14 or light receiver 16 is comprised of a combination of opaque and clear blocks 32 and 34, the latter being on the extreme outer end of each rod. The outer planar surfaces of the clear portion on both the eyepiece and light receiver are flush with the outer end faces 36 and 38 of the rods 18 and 20 respectively. All outside edges of the eyepiece and light receiver may be rounded to a suitable radius to insure safety in and durability of the device during its use. Generally, for best viewing results the observer's eye should be placed next to the eyepiece on the longer rod 18 and aligned with its end face 36. The light receiver 14 which is preferably attached to the shorter rod is now moved to align the end face 38 of the smaller rod 20 with a light source as an object to be viewed. What the observer sees in the eyepiece is the object viewed at the center square of an image, plus multiple reflections along a plurality of symmetrical planes due to the reflections of light along the flat surfaces of the rods. Now, by twisting the shorter rod 20 relative to the larger rod 18 the observer sees a changing scene of many complex kaleidoscopic patterns based on the object viewed. Increased complexity of these patterns can be achieved by changing the angular relationship of the two rods as shown in FIG. 3, either with or without the twisting action, all of which is possible because of the flexible plastic joint 24 between the rods. The rods can be moved to almost any desired position relative to each other, the flexible joint 24 serving as a viewing window when the device is held in this position. Additional effects of changing patterns can be provided by constantly moving or twisting one rod relative to the other.

The transparency and flexibility of the sheath 22 at the flexible joint 24 allows the latter to function as an asymmetrical and variable lens. For example, as shown in FIG. 3a, when an observer views an object (preferably one having color) through the rod 18 with the flexible sheath section bent and/or twisted and held adjacent the object while the smaller rod is pointing at a light source, light passes through the smaller rod and through portions of the flexible sheath at the flexible section 24, thereby projecting light patterns onto the area viewed. The resulting combined patterns viewed through the eyepiece are considerably illuminated, have an appearance of depth with added controllable color and can be made at will to appear as a symmetrical array of changeable shapes similar to flowers, leaves or jewels and the like.

The color in the pattern viewed occurs when the small rod is pointed toward a fairly bright white light source so that the light strikes the light receiver at approximately at 45° angle. This causes the light striking the end surface 38 of the smaller rod and the side surfaces of the rod end through the clear block 34 to be diffracted into the colors of the spectrum. By manipulating the rods 18 and 20 with respect to each other, the observer can control the intensity and quality of color, the dominant color and the design configuration. The images viewed have a depth effect because different colors and light intensities are reflected from different positions along the rods.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A device for producing different kaleidoscopic patterns comprising:
a pair of transparent, flat sided rods of unequal length, each having transverse faces at their opposite ends;
a sheath of flexible material extending tightly around both of said rods for holding them a predetermined spaced distance apart at their inner ends, a flexible tubular section being thereby formed between said rods so that they can be twisted or bent to different angular positions relative to each other.
2. The device as described in claim 1 wherein said rods have a substantially square cross section.
3. The device as described in claim 1 wherein the larger of said rods is between three to four times the length of the smaller rod.
4. The device as described in claim 1 wherein said rods are solid Lucite and said sheath is a flexible, transparent vinyl tubing.
5. The device as described in claim 1 including an eyepiece fixed to the outer end of the larger of said rods and a light receiver fixed to the outer end of the smaller of said rods.
6. The device as described in claim 5 wherein said eyepiece and said light receiver both comprise an enlarged block of rigid material including an outermost clear portion.
7. The device as described in claim 6 wherein said transparent sheath extends to near the outer end of both the larger rod and the smaller rod, and means around the ends of said sheath for keying the rods within said enlarged blocks at both ends of the device.
8. The device as described in claim 6 wherein both said enlarged blocks are composed of a polyester resin, an inner portion of each block being opaque and being adjacent to said outermost clear portion.
9. The device as described in claim 8 wherein said outermost clear portion of said light receiver is a material having a light dispersing property in combination with the flat surfaces of the surrounded rod end portion.
10. The device as described in claim 6 wherein the outer end faces of both said rods are each flush with a coincident planar surface of a said enlarged block.

References Cited
UNITED STATES PATENTS
1,944,111 1/1934 Schieren.
3,170,980 2/1965 Pritchard.

FOREIGN PATENTS
44-1157 1/1969. Japan.

OTHER REFERENCES
Chen, M. M., et al.: The Use of a Kaleidoscope to Obtain Uniform Flux Oxer a Large Area in a Solar or Arc Imaging Furnace. In Applied Optics, vol. 2, No. 3, March 1963, pp. 265-6.

LOUIS R. PRINCE, Primary Examiner

F. SHOON, Assistant Examiner

U.S. Cl. X.R.
350—96